United States Patent
Kuang

(10) Patent No.: US 11,103,098 B2
(45) Date of Patent: Aug. 31, 2021

(54) VALVE, COFFEE MAKER HAVING SAME, AND METHOD FOR CONTROLLING COFFEE MAKER

(71) Applicants: GUANGDONG MIDEA CONSUMER ELECTRICS MANUFACTURING CO., LTD., Foshan (CN); MIDEA GROUP CO., LTD., Foshan (CN)

(72) Inventor: Jian Kuang, Foshan (CN)

(73) Assignees: GUANGDONG MIDEA CONSUMER ELECTRIC MANUFACTURING CO., LTD., Foshan (CN); MIDEA GROUP CO., LTD., Foshan (CN)

(*) Notice: Subject to any disclaimer, the term of this patent is extended or adjusted under 35 U.S.C. 154(b) by 620 days.

(21) Appl. No.: 15/845,935

(22) Filed: Dec. 18, 2017

(65) Prior Publication Data

US 2018/0103791 A1    Apr. 19, 2018

Related U.S. Application Data

(63) Continuation of application No. PCT/CN2015/088682, filed on Aug. 31, 2015.

(30) Foreign Application Priority Data

Jun. 24, 2015 (CN) .......................... 201510353131.2
Jun. 24, 2015 (CN) .......................... 201510354555.0

(Continued)

(51) Int. Cl.
*A47J 31/06* (2006.01)
*A47J 31/46* (2006.01)
*F16K 7/17* (2006.01)

(52) U.S. Cl.
CPC .......... *A47J 31/0605* (2013.01); *A47J 31/461* (2018.08); *F16K 7/17* (2013.01)

(58) Field of Classification Search
CPC ...... A47J 31/00; A47J 31/0605; A47J 31/061; A47J 31/32; A47J 31/46; A47J 31/461;
(Continued)

(56) References Cited

U.S. PATENT DOCUMENTS 4,119,120 A * 10/1978 Mehaffy ................ G01N 30/20
137/885
5,372,061 A * 12/1994 Albert .................... A47J 31/46
99/281

(Continued)

FOREIGN PATENT DOCUMENTS

CN        1348536 A      5/2002
CN      101072964 A     11/2007
(Continued)

OTHER PUBLICATIONS

Midea Group Co., Ltd./Guangdong Mide Domestic Electrical Appliance Manufacturing Co. Ltd., International Search Report and Written Opinion, PCT/CN2015/088682, dated Mar. 31, 2016, 15 pgs.

(Continued)

*Primary Examiner* — Justin C Dodson
(74) *Attorney, Agent, or Firm* — Morgan, Lewis & Bockius LLP

(57) ABSTRACT

A valve (100) comprises: a housing (110), an elastic cap (120) and a driving device (13); at least one group of ports (111) is provided in the housing, and each group of ports comprises an inlet (111*a*) and an outlet (111*b*); at least a portion of the elastic cap is provided in the housing; and the driving device is used to drive the elastic cap to undergo an elastic deformation so as to obstruct the inlet and the outlet.

19 Claims, 3 Drawing Sheets

(30) Foreign Application Priority Data

Jun. 24, 2015 (CN) .......................... 201520437807.1
Jun. 24, 2015 (CN) .......................... 201520438484.8

(58) Field of Classification Search
CPC .... A47J 31/469; F16K 7/17; Y10T 137/3115; F15D 1/02
USPC ..... 99/279, 280, 283, 282, 288, 289 R, 299, 99/300, 302 FB, 302 R, 304, 305; 251/61.1, 61.2; 137/206; 138/43, 48, 93
See application file for complete search history.

(56) References Cited

U.S. PATENT DOCUMENTS

| | | | | |
|---|---|---|---|---|
| 5,392,694 | A * | 2/1995 | Muller | A47J 31/36 99/295 |
| 5,769,387 | A * | 6/1998 | Perez C. | F16K 7/17 251/61.4 |
| 7,163,024 | B2 * | 1/2007 | Igawa | F16K 31/1268 137/486 |
| 2010/0296953 | A1 * | 11/2010 | Gray | F04B 53/10 417/437 |
| 2013/0048124 | A1 * | 2/2013 | Huang | A61M 39/26 137/843 |

FOREIGN PATENT DOCUMENTS

| | | |
|---|---|---|
| CN | 102269280 A | 12/2011 |
| CN | 204133223 U | 2/2015 |
| GB | 2411218 A | 8/2005 |
| GB | 2456563 A | 7/2009 |

OTHER PUBLICATIONS

Midea Group Co., Ltd./Guangdong Mide Domestic Electrical Appliance Manufacturing Co. Ltd., First Office Action, CN201510353131.2, dated Feb. 12, 2018, 11 pgs.

* cited by examiner

VALVE, COFFEE MAKER HAVING SAME, AND METHOD FOR CONTROLLING COFFEE MAKER

PRIORITY CLAIM AND RELATED APPLICATION

This application is a continuation application of PCT/CN2015/088682, entitled "VALVE, COFFEE MAKER HAVING SAME, AND METHOD FOR CONTROLLING COFFEE MAKER" filed on Aug. 31, 2015, which claims priority to (i) Chinese Patent Application No. 201510353131.2, filed with the State Intellectual Property Office of the People's Republic of China on Jun. 24, 2015, (ii) Chinese Patent Application No. 201520437807.1, filed with the State Intellectual Property Office of the People's Republic of China on Jun. 24, 2015, (iii) Chinese Patent Application No. 201510354555.0, filed with the State Intellectual Property Office of the People's Republic of China on Jun. 24, 2015, and (iv) Chinese Patent Application No. 201520438484.8, filed with the State Intellectual Property Office of the People's Republic of China on Jun. 24, 2015, all of which are incorporated herein by reference in their entirety.

FIELD OF THE INVENTION

The present disclosure relates to a field of household appliances, and particularly to a valve, a coffee maker having same, and a method for controlling a coffee maker.

BACKGROUND

A direction conversion required by a pipeline of a coffee maker is usually realized by a solenoid valve. The solenoid valve has a complicated structure and a high price, thus causing cost increase of a complete machine. Meanwhile, the coffee maker and a water storage and heating system of the coffee maker have a complicated structure and high cost, which is not suitable for popularization and use of the coffee maker and also causes difficulty of maintenance of the coffee maker. In addition, a present boiler has a potential safety risk, and the communication between the boiler pressure and the atmosphere is solved by the solenoid valve, so the structure is complicated and the cost is high.

SUMMARY

The present disclosure seeks to solve one of the technical problems existing in the related art to at least some extent.

Thus, an objective of the present disclosure aims to provide a valve, which has a simple structure and low cost.

Another objective of the present disclosure is to provide a coffee maker having the above-mentioned valve.

Yet another objective of the present disclosure is to provide a method for controlling the above-mentioned coffee maker.

The valve according to some embodiments of the present disclosure includes: a housing provided with at least one group of ports, each group of the ports including an inlet and an outlet; an elastic cap, at least a part of the elastic cap being provided in the housing; and a driving device configured to drive the elastic cap to perform elastic deformation so as to separate the inlet from the outlet.

In the valve according to some embodiments of the present disclosure, by driving the elastic cap to perform deformation by means of the driving device so as to separate or communicate the inlet and the outlet, the valve has a simple structure and low cost, and hence the cost of the complete coffee maker is reduced to some extent.

Specifically, the driving device is a pneumatic driving device or a hydraulic driving device.

Optionally, the elastic cap is a silica gel piece.

In some embodiments of the present disclosure, the elastic cap is provided with an elastic deformation face, and the elastic deformation face performs the deformation so as to separate the inlet from the outlet when the driving device drives the elastic cap.

In some embodiments of the present disclosure, the elastic cap is provided with a cavity therein, the driving device being connected to the cavity so as to change gas pressure or liquid pressure in the cavity.

Further, the elastic cap is configured to be a substantially cylindrical structure having an open bottom, a medium circulation cavity is defined between the housing and the elastic cap, and the ports are in communication with the medium circulation cavity; the valve further includes a base enclosing a bottom of the elastic cap and provided with an inflating port in communication with an interior of the elastic cap, the driving device being connected to the inflating port.

In some embodiments of the present disclosure, the elastic cap includes a top wall and a side wall, and at least a part of the top wall is formed as the elastic deformation face.

In some embodiments of the present disclosure, the base is provided with an annular projection protruding towards the housing, and the housing is fitted over the annular projection.

In some embodiments of the present disclosure, the elastic cap includes a top wall and a side wall, a mounting portion is provided at an end of the side wall away from the top wall, the mounting portion extends towards an outer side of the side wall, and the housing and the annular projection cooperate to clamp the mounting portion.

The coffee maker according to some embodiments of the present disclosure includes: a boiler; a brewing chamber in communication with the boiler; a valve according to the above-mentioned embodiments, the valve being provided with a group of ports configured to circulate gas, the ports configured to circulate gas including a gas inlet and a gas outlet, the gas inlet being in communication with the boiler, the gas outlet being in communication with outside air, an elastic cap being convertible between a closed state where the gas inlet and the gas outlet are separated and a communication state where the gas inlet and the gas outlet are communicated, the elastic cap being in the communication state normally. When the driving device is communicated with the boiler and the elastic cap is in the closed state, the driving device can drive water in the boiler to flow to the brewing chamber through a pipeline.

The coffee maker according to some embodiments of the present disclosure has a simple structure, low cost and high stability, and is convenient to produce, operate, and maintain.

In some embodiments of the present disclosure, the coffee maker further includes a water tank, the valve is further provided with a group of ports configured to circulate liquid, the ports configured to circulate liquid includes a water inlet and a water outlet, the water inlet is communicated with the water tank, the water outlet is communicated with the boiler, the elastic cap separates the water inlet from the water outlet when in the closed state, and the elastic cap communicates the water inlet and the water outlet when in the communication state.

Optionally, at least a part of the water tank is disposed above the boiler.

In some embodiments of the present disclosure, the boiler is provided with a temperature sensor configured to detect temperature inside the boiler, and further provided with a liquid level sensor configured to detect a water level in the boiler.

In the method for controlling the coffee maker according to some embodiments of the present disclosure, the coffee maker is the coffee maker according to the above-mentioned embodiments of the present disclosure, and the method includes: heating a boiler after adding an appropriate amount of water into the boiler, and allowing the boiler to be communicated with the atmosphere by means of a valve in a heating process of the boiler; operating the driving device to drive the valve to convert to a closed state and driving the water in the boiler by the driving device to flow to the brewing chamber through the pipeline, after the heating is finished.

Optionally, the driving device is a gas pump.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

Figure 1:
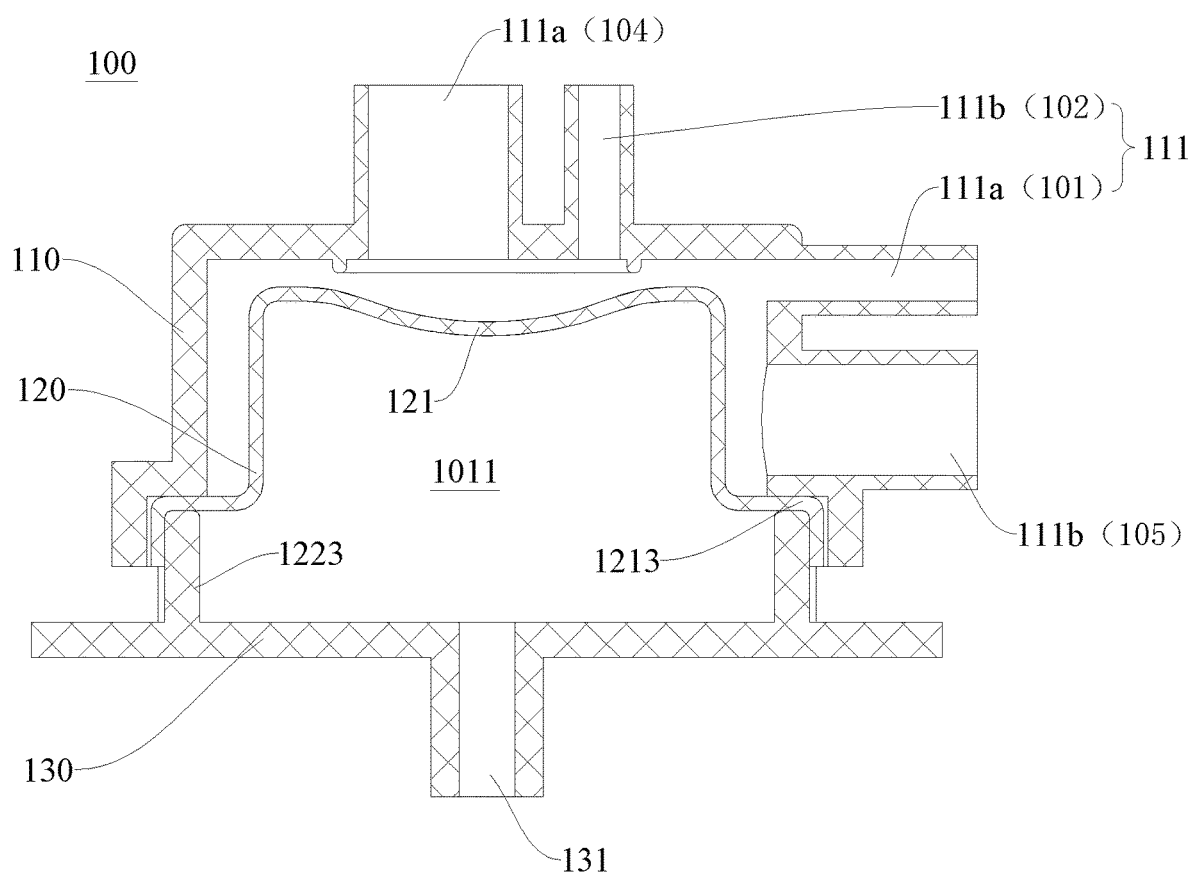
FIG. 1 is a schematic view of a valve according to some embodiments of the present disclosure.

Reference numerals: valve 100, housing 110, port 111, inlet 111a, outlet 111b, elastic cap 120, elastic deformation face 121, top wall 122, side wall 123, mounting portion 1213, base 130, cavity 1011, coffee maker 1, boiler 11, gas inlet 101, gas outlet 102, inflating port 131, water inlet 104, water outlet 105, annular projection 1223, driving device 13, water tank 14, temperature sensor 15, liquid level sensor 16, brewing chamber 17, and pipeline 18.

DETAILED DESCRIPTION

Embodiments of the present disclosure are described in detail in the following. The examples of the embodiments are illustrated in the accompanying drawings. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, it is to be understood that terms such as "central," "longitudinal," "lateral," "length," "width," "thickness," "upper," "lower," "front," "rear," "left," "right," "vertical," "horizontal," "top," "bottom," "inner," "outer," "clockwise," "counterclockwise," "axial," "radial," and "circumferential," should be construed to refer to the orientation as then described or as shown in the drawings under discussion. These relative terms are for convenience of description and do not require that the present disclosure be constructed or operated in a particular orientation, which cannot be construed to limit the present disclosure.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present disclosure, "a plurality of" means two or more than two, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interactions relationship of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A valve 100 according to some embodiments of the present disclosure is described in detail in the following in combination with FIG. 1 and FIG. 2. The valve 100 can be applied to a coffee maker for direction change of pipelines.

The valve 100 according to some embodiments of the present disclosure can include a housing 110, an elastic cap 120 and a driving device 13.

Figure 2:
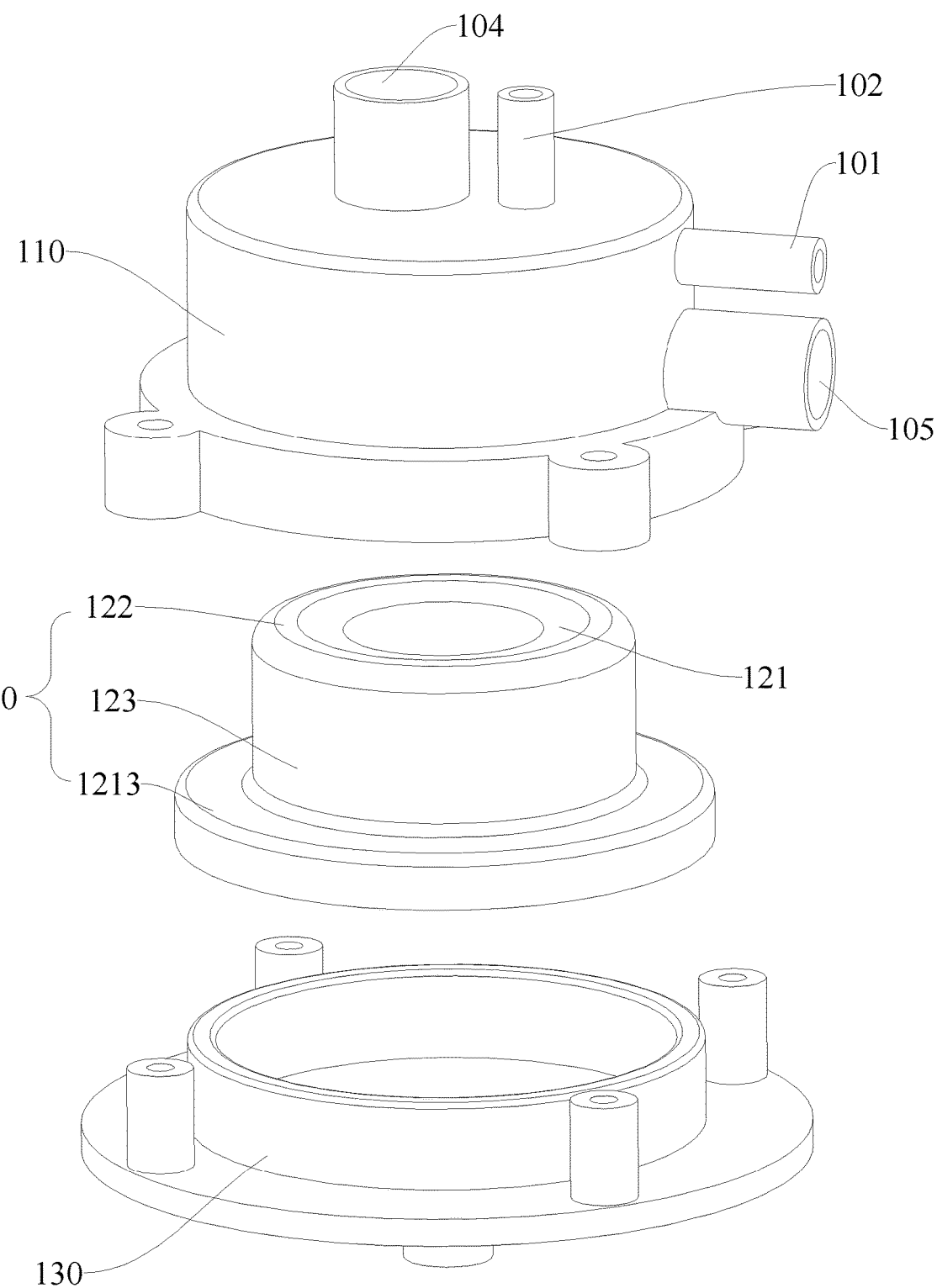
FIG. 2 is an exploded view of a valve according to some embodiments of the present disclosure.

As illustrated in FIG. 1 and FIG. 2, the housing 110 is provided with at least one group of ports 111, and each group of the ports 111 includes an inlet 111a and an outlet 111b.

That is, the housing 110 can be provided with one group of ports 111, or provided with a plurality of groups of ports 111. One flow channel can be provided between each group of the ports 111, or a plurality of ports share one flow channel. Liquid or gas can flow into the flow channel through the inlet 111a, and the gas or the liquid can flow out from the outlet 111b. When the valve 100 is provided with one group of ports 111 configured to circulate gas, the inlet 111a of the ports 111 configured to circulate gas is a gas inlet 101, and the outlet 111b of the ports 111 configured to circulate gas is a gas outlet 102. When the valve 100 is provided with one group of ports 111 configured to circulate liquid, the inlet 111a of the ports 111 configured to circulate liquid is a water inlet 104, and the outlet 111b of the ports 111 configured to circulate liquid is a water outlet 105.

At least a part of the elastic cap 120 is provided in the housing 110, and the driving device 13 is configured to drive the elastic cap 120 to perform elastic deformation so as to obstruct the inlet 111a and the outlet 111b.

For example, it is possible that a part of the elastic cap 120 performs the deformation so as to separate the inlet 111a from the outlet 111b, and it is also possible that the whole elastic cap 120 performs the elastic deformation so as to separate the inlet 111a from the outlet 111b. The elastic cap 120 can block the inlet 111a so as to separate the inlet 111a from the outlet 111b, or block the outlet 111b so as to separate the inlet 111a from the outlet 111b, and or block the channel between the inlet 111a and the outlet 111b so as to separate the inlet 111a from the outlet 111b.

Specifically, the driving device can be a pneumatic driving device or a hydraulic driving device. When the driving device is the hydraulic driving device, the driving device can drive liquid to enter an interior of the elastic cap 120, so that an inside pressure of the elastic cap 120 is larger than an outside pressure of the elastic cap 120, and hence the elastic cap 120 performs the deformation so as to separate the inlet 111a from the outlet 111b. When the driving device doesn't operate, the liquid can be discharged out of the interior of the elastic cap 120, hence the elastic cap 120 returns to its original shape, and the inlet 111a and the outlet 111b are communicated.

When the driving device is the pneumatic driving device, the driving device can drive gas to enter an interior of the elastic cap 120, so that an inside pressure of the elastic cap 120 is larger than an outside pressure of the elastic cap 120, and hence the elastic cap 120 performs the deformation so as to separate the inlet 111a from the outlet 111b. When the driving device doesn't operate, the gas can be discharged out of the interior of the elastic cap 120, hence the elastic cap 120 returns to the original shape, and the inlet 111a and the outlet 111b are communicated.

In a specific example of the present disclosure, the driving device is the pneumatic driving device, and for example the driving device can be a gas pump. Certainly, it could be understood that, a type of the driving device can be selected by a designer according to actual conditions, which will not be specifically limited here.

In the valve 100 according to some embodiments of the present disclosure, the elastic cap 120 is driven by means of the driving device to perform the deformation so as to separate or communicate the inlet 111a and the outlet 111b. The valve 100 has a simple structure and low cost, thus reducing cost of the complete coffee maker to some extent.

In some embodiments of the present disclosure, the elastic cap 120 is a silica gel piece. Thus, the elastic cap 120 has stable performance, a low cost, and good elasticity, which guarantees that the valve 100 operates stably and safely.

Certainly, it could be understood by those ordinarily skilled in the art that it is only a specific embodiment of the present disclosure that the elastic cap 120 is the silica gel piece, which is not a limitation to the present disclosure. For example, the elastic cap 120 can also be a rubber part.

In some embodiments of the present disclosure, as illustrated in FIG. 1 and FIG. 2, the elastic cap 120 is provided with an elastic deformation face 121, and the elastic deformation face 121 performs the deformation so as to separate the inlet 111a from the outlet 111b when the driving device drives the elastic cap 120. In other words, when the driving device operates, only a part of the elastic cap 120 performs the deformation so as to separate the inlet 111a from the outlet 111b. Thus, it is possible to configure a part of the elastic deformation face 121 as an elastic piece in the elastic cap 120, so that use of elastic materials is decreased, and the cost of the valve 100 is reduced to at least some extent.

In some embodiments of the present disclosure, the elastic cap 120 is provided with a cavity 1011 therein, and the driving device is connected to the cavity 1011 so as to change gas pressure in the cavity 1011. For example, the driving device can pump gas into the cavity 1011 to increase the gas pressure in the cavity 1011, hence making the elastic cap 120 to perform elastic deformation so as to separate the inlet 111a from the outlet 111b. When the driving device doesn't operate, the elastic cap 120 can return to the original state under the action of its own resilience force, and hence the inlet 111a and the outlet 111b can be communicated.

Otherwise, the driving device can be connected to the cavity 1011 so as to change liquid pressure in the cavity 1011. For example, the driving device can pump liquid into the cavity 1011 to increase the liquid pressure in the cavity 1011, hence making the elastic cap 120 to perform elastic deformation so as to separate the inlet 111a from the outlet 111b. When the driving device doesn't operate, the elastic cap 120 can return to the original state under the action of its own resilience force, and hence the inlet 111a and the outlet 111b can be communicated.

Specifically, as illustrated in FIG. 1 and FIG. 2, the elastic cap 120 is configured to be a substantially cylindrical structure having an open bottom. The valve 100 further includes a base 130, the base 130 encloses a bottom of the elastic cap 120 and is provided with an inflating port 131 in communication with the interior of the elastic cap 120, and the driving device is connected to the inflating port 131.

That is, the cavity 1011 is defined by the elastic cap 120 and the base 130 together, the base 130 is provided with the inflating port 131 connected to the gas pump, the driving device can inflate the cavity 1011 so as to change the gas pressure in the cavity 1011, or the driving device can fill liquid into the cavity 1011 so as to change the liquid pressure in the cavity 1011, such that the elastic cap 120 performs the elastic deformation so as to separate the inlet 111a from the outlet 111b. When the driving device doesn't operate or the driving device sucks the gas or the liquid in the cavity 1011 out, the elastic cap 120 can return to the original position, and thus the inlet 111a and the outlet 111b in the housing 110 can be communicated. Accordingly, the communication or closure of the inlet 111a and the outlet 111b of the valve 100 can be realized.

More specifically, the base 130 and the housing 110 can be fastened together by means of a threaded fastener (e.g. a screw), and the elastic cap 120 is clamped between the housing 110 and the base 130. As illustrated in FIG. 1, the base 130 is provided with an annular projection 1223 protruding towards the housing 110, the housing 110 is fitted over the annular projection 1223, and the elastic cap 120 is clamped between the housing 110 and the annular projection 1223. A medium circulation cavity is defined between the elastic cap 120 and the housing 110, and the ports 111 are in communication with the medium circulation cavity. It could be understood that the medium circulation cavity is namely the one flow channel or the plurality of flow channels between the inlet 111a and the outlet 111b, and the cavity 1011 is defined between the base 130 and the elastic cap 120.

Further specifically, as illustrated in FIG. 1 and FIG. 2, the elastic cap 120 includes a top wall 122 and a side wall 123. A mounting portion 1213 is provided at an end of the side wall 123 away from the top wall 122, the mounting portion 1213 extends towards an outer side of the side wall 123, and the housing 11 and the annular projection 1223 cooperate to clamp the mounting portion 1213.

As illustrated in FIG. 1 and FIG. 2, the elastic cap 120 includes the top wall 122 and the side wall 123, and at least a part of the top wall 122 forms the elastic deformation face 121. In a specific example of the present disclosure, the elastic deformation face 121 is formed by recessing at least a part of the top wall 122 downwards. In a normal state, as the top wall 122 is recessed downwards, the top wall 122 and the inlet 111a are spaced apart for a certain distance, gas or liquid can flow between the inlet 111a and the outlet 111b through a gap between the top wall 122 and the inlet 111a. When the pressure in the cavity 1011 is increased up to a certain value, the elastic deformation face 121 protrudes upwards to block the inlet 111a, hence separating the inlet 111a from the outlet 111b, and the liquid or gas cannot circulate between the inlet 111a and the outlet 111b.

Figure 3:
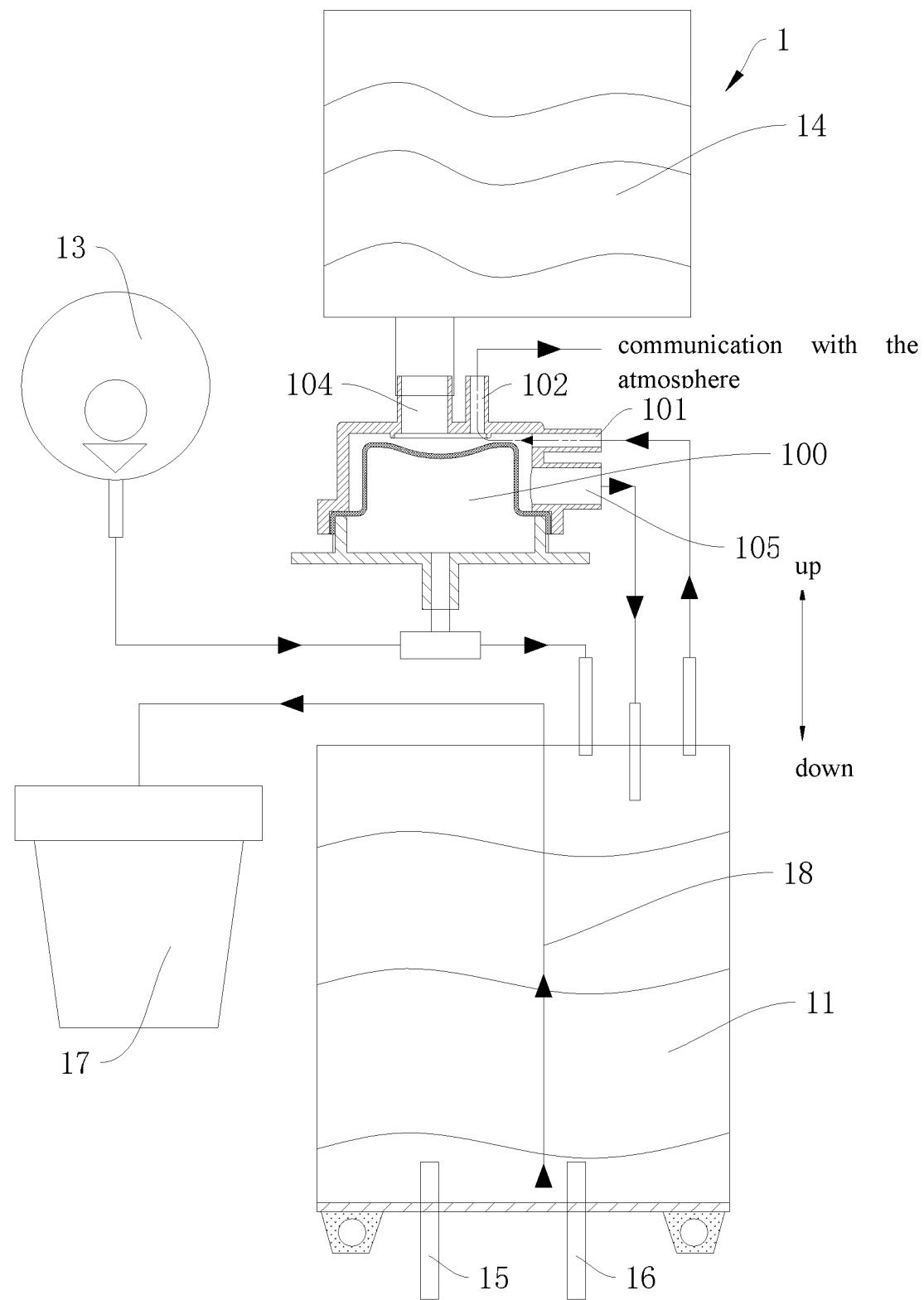
FIG. 3 is a schematic view of a coffee maker according to some embodiments of the present disclosure.

In some embodiments of the present disclosure, as illustrated in FIG. 1 to FIG. 3, two groups of ports 111 are provided, one group is configured to circulate liquid, and the other group is configured to circulate gas.

That is, two groups of ports 111 are provided in the housing 110, such as the first ports and the second ports. The first ports 111 are configured to circulate liquid (for example, water), and the second ports are configured to circulate gas (for example, air). The first ports include the water inlet 104 and the water outlet 105, and the second ports include the gas inlet 101 and the gas outlet 102. The gas inlet 101 and the water inlet 104 are namely the inlet 111a, and the gas outlet 102 and the water outlet 105 are namely the outlet 111b.

Specifically, as illustrated in FIG. 1 to FIG. 3, the water inlet 104 and the gas outlet 102 are disposed at a side of the housing 110, and the water outlet 10 and the gas inlet 101 are disposed at another side of the housing 110. The housing 110 is configured to be a substantially cylindrical structure having an open bottom and includes a top wall portion and a side wall portion, the side wall portion being provided at an outer circumferential edge of the top wall portion and extending downwards. The water inlet 104 and the gas outlet 102 are disposed to the top wall portion, and the gas inlet 101 and the water outlet 105 are disposed to the side wall portion.

The water outlet 105 is located below the gas inlet 101. Thus, the liquid can flow out from the water outlet 105 located below under the action of gravity, instead of flowing backward to the gas inlet 101.

Certainly, it could be understood that the water outlet 105 and the gas inlet 101 can also share an opening, and the shared opening can not only serve as the outlet 111b of a liquid channel, but also the inlet 111a of a gas channel.

The coffee maker 1 according to some embodiments of the present disclosure will be described in detail with reference to FIG. 1 to FIG. 3 in the following.

In combination with FIG. 3, the coffee maker 1 according to some embodiments of the present disclosure include: a boiler 11, a valve 100, a driving device 13 and a brewing chamber 17.

Specifically, the brewing chamber 17 is in communication with the boiler 11, and a pipeline 18 connecting the brewing chamber 17 and the boiler 11 can extend to a bottom inside the boiler 11. The valve 100 is provided with a group of ports 11 configured to circulate gas. The ports 111 configured to circulate gas includes a gas inlet 101 and a gas outlet 102. The gas inlet 101 is in communication with the boiler 11, and the gas outlet 102 is in communication with outside air. The elastic cap 121 is convertible between a closed state where the gas inlet 101 and the gas outlet 102 are separated and a communication state where the gas inlet 101 and the gas outlet 102 are communicated, and the elastic cap 121 is normally in the communication state (refer to FIG. 1), that is, the elastic cap 121 is normally in a state allowing the boiler 11 to be in communication with the atmosphere. The driving device 13 is configured to drive the elastic cap 121 to convert to the closed state where the gas inlet 101 and the gas outlet 102 are separated. The driving device 13 is in communication with the boiler 11. When the elastic cap 121 is in the closed state, the driving device 13 can drive water in the boiler 11 to flow to the brewing chamber 17 through the pipeline 18.

They coffee maker can further include a heating device. The heating device is configured to heat the boiler 11. At least a part of the heating device can be disposed adjacent to the boiler 11.

In the coffee maker 1 according to some embodiments of the present disclosure, by providing the valve 100, in a normal heating process of the boiler 11, the boiler 11 is in communication with the outside air so as to make the gas pressure in the boiler 11 substantially consistent with the outside air and prevent the incompletely heated water from being discharged into the brewing chamber 17; when the boiler 11 finishes heating, the driving device 13 drives the elastic cap 121 to convert to the closed state, so as to make the gas pressure in the boiler 11 rise, and the water in the boiler 11 is pressed into the brewing chamber 17.

The present disclosure simplifies a structure of the coffee maker, so that the coffee maker has a simple structure, low cost, and high stability, and is convenient to produce, operate, and maintain.

In addition, in some embodiments of the present disclosure, the driving device 13 can be a gas pump. The valve 100 performs gas pressure direction conversion by means of the driving device 13. When the driving device 13 doesn't operate, the boiler 11 is normally in communication with the atmosphere. When the driving device 13 operates, the valve 100 performs the direction conversion under a pressure action of the driving device 13, a pipeline by which the boiler 11 is communicated with the atmosphere is closed so that the boiler 11 is sealed and the hot water can only flow out from the pipeline 18, thus realizing a function of brewing coffee. When the driving device 13 stops operating, the valve 100 returns to the original state. There are three key functions of a combination of the valve 100 and the driving device 13. Firstly, the valve 100 is allowed to convert direction and brew coffee; secondly, when the hot water runs out, the gas in the driving device 13 can blow-dry the residual water in the brewing chamber 17, and leakage problem is solved; thirdly, an interior of the boiler 11 is normally in communication with the atmosphere when being heated, and the boiler 11 is sealed only when the driving device 13 operates, and the pressure is produced only relying on an external action, thus solving safety problem of the boiler 11.

In addition, in the present disclosure, it is possible to enclose the boiler 11 by driving the valve 100, continue heating the boiler, and drive the water in the boiler 11 to flow towards the brewing chamber 17 through vapor pressure in the boiler.

In order to add water into the boiler 11, the boiler 11 can be configured in a form where a boiler cover is provided, so that a purpose of opening or closing the boiler 11 is realized by opening or closing the boiler cover, and the water can be injected when the boiler 11 is opened. In addition, the water can be supplied into the boiler 11 by providing a water tank 14, e.g. delivering the water in the water tank 14 to the boiler 11 by means of a water pump or enabling the water in the water tank 14 to enter the boiler 11 under the action of gravity by disposing the water tank 14 upwards. The following case where the water tank is provided to inject water to the boiler 11 will be described as an example.

Referring to FIG. 1 to FIG. 3, in some embodiments of the present disclosure, the coffee maker 1 further includes the water tank 14, and the valve 100 is further provided with a group of ports 111 configured to circulate liquid. The ports 111 configured to circulate liquid include the water inlet 104 and the water outlet 105. The water inlet 104 is in communication with the water tank 14, and the water outlet 105 is in communication with the boiler 11. The elastic cap 121 in the closed state separates the water inlet 104 from the water outlet 105, and the water inlet 104 and the water outlet 105 are communicated when the elastic cap 121 is in the communication state. It is possible to improve sealing property of the boiler 11 by supplying water into the boiler 11 by means of the water tank 14. In addition, it is also possible to simplify the structure of the coffee maker 1 by disposing the water inlet 104 and the water outlet 105 in the housing 110, which is convenient for the production and control.

The water inlet 104 and the gas outlet 102 can coincide, so that the gas outlet 102 is communicated with the outside air through the water tank 14. The water outlet 105 and the gas inlet 101 can also coincide, thus realizing water inflow and gas outflow of the boiler 11.

In addition, the water can also be supplied to the boiler 11 by means of the water tank 14 through pipelines disposed additionally. For example, the water pump can be disposed between the water tank 14 and the boiler 11 to pump the water in the water tank 14 into the boiler 11, or the water tank 14 is disposed above the boiler 11 and a valve is provided to control the water tank 14 to supply water into the boiler 11.

Further, referring to FIG. 3, at least a part of the water tank 14 is disposed above the boiler 11, which is convenient to inject the water in the water tank 14 into the boiler 11.

Preferably, the whole water tank 14 can be disposed above the boiler 11. Further, the valve 100 can be disposed in a position between a plane where a lower end of the water tank 14 exists and a plane where an upper end of the boiler 11 exists.

As illustrated in FIG. 3, in some embodiments of the present disclosure, the boiler 11 is provided with a temperature sensor 15 configured to detect internal temperature of the boiler 11, so that the temperature in the boiler 11 can be known in real time to facilitate entering the next process when the temperature in the boiler 11 reaches a preset temperature, which not only increases efficiency, but also reduces energy consumption.

The temperature sensor 15 can be provided to a top of, a bottom of, or a side surface of the boiler 11.

Further, referring to FIG. 3, the boiler 11 is provided with a liquid level sensor 16. A liquid level in the boiler 11 can be known by means of the liquid level sensor 16, which improves safety and stability of the boiler 11, and also realizes fix quantify production of hot water.

The present disclosure further provides a method for controlling a coffee maker, and the coffee maker is the coffee maker according to the pre-described embodiments of the present disclosure. The method includes: heating the boiler after adding an appropriate amount of water into the boiler and allowing the boiler to be communicated with atmosphere by means of the valve in a heating process of the boiler; when the heating finished, operating the driving device to drive the valve to convert to a closed state, and driving the water in the boiler by the driving device to flow to the brewing chamber through the pipeline.

In the method for controlling the coffee maker according to some embodiments of the present disclosure, by providing the valve, in a normal heating process of the boiler, the boiler is in communication with the outside air so as to make the gas pressure in the boiler substantially consistent with the outside air and prevent the incompletely heated water from being discharged into the brewing chamber; when the boiler finishes heating, the driving device drives the valve to convert to the closed state and drives the water in the boiler to flow into the brewing chamber through pipelines.

In some embodiments of the present disclosure, the driving device is a gas pump.

Specifically, in combination with FIG. 1 to FIG. 3, when the coffee maker 100 in the present disclosure operates:

Firstly, water is added into the boiler 11 by the water tank 14, in which a fix quantity of water supply can be realized by controlling the water tank 14.

Then, the boiler 11 is heated, and at this moment the elastic deformation face 121 of the elastic cap 121 is in a downwardly recessed shape, so that a water passage (the channel between the water inlet 104 and the water outlet 105) is passable and a gas passage (the channel between the gas inlet 101 and the gas outlet 102) is passable, the vapor in the heating process can be discharged out through the gas outlet 102, and the gas pressure in the boiler 11 doesn't change a lot and is substantially the same as the air pressure of outside air.

Finally, the temperature in the boiler 11 is detected by means of the temperature sensor 15 (for example detecting water temperature directly), in which the heating is stopped when the water temperature in the boiler 11 reaches the preset temperature and the driving device 13 is started. Under the action of the driving device 13, the elastic deformation face 121 of the elastic cap 121 is in an upwardly protruded shape, and the valve 100 converts to the closed state so as to make the boiler 11 disconnected from the outside air. At this moment the operation of the driving device 13 increases the gas pressure in the boiler 11, and the action of the gas pressure allows the hot water in the boiler 11 to be discharged into the brewing chamber 17.

When the driving device 13 is stopped, the elastic deformation face 121 returns to the downwardly recessed shape.

In combination with FIG. 1 and FIG. 2, the valve 100 of the present disclosure is provided with four ports (the gas inlet 101, the gas outlet 102, the water inlet 104 and the water outlet 105) to form two groups of pipelines, one group is water-passable and the other is gas-passable. The elastic cap 121 (for example a silica gel cap) in the valve 100 can bulge under the action of outer pressure to seal two upper holes of the valve 100 so as to make the boiler to be in the closed state.

The water tank 14 is disposed above, and the water flows into the boiler 11 through the valve 100 under the action of the gravity until filling up the boiler 11. The liquid level sensor 16 has a function of sensing the water level. The heating is started when the water level is sensed, and the heating is stopped when the preset temperature is reached. When the preset temperature is sensed, the driving device 13 starts to operate, a first end of the driving device blows towards the valve 100 and the elastic cap 121 budges due to the gas pressure and seals the two holes above, and a second end of the driving device blows into the boiler 11. The boiler 11 is in the closed state at this moment and the hot water in the boiler 11 flows towards the brewing chamber 17, thus realizing a coffee brewing effect. When the coffee brewing is finished, the driving device 13 stops operating, the elastic cap 121 returns to the original shape, and the next cycle is started.

The driving device in the present disclosure can have at least the functions as follow: A. discharging the water in the boiler; B. sealing the water tank and pipelines in communication with the atmosphere by means of the valve; C. blowing-drying a capsule.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases throughout this specification are not necessarily referring to the same embodiment or example of the present disclosure. Furthermore, the particular features, structures, materials, or characteristics may be combined in any suitable manner in one or more embodiments or examples. In addition, different embodiments or examples or features in the different embodiments or examples described in the present specification can be united or combined by those skilled in the art in the condition of no contradiction.

Although explanatory embodiments have been shown and described, it would be appreciated that the above embodiments are illustrative cannot be construed to limit the present disclosure, and changes, alternatives, and modifications can be made in scope of the present disclosure by those skilled in the art.

What is claimed is:

1. A valve, comprising:
   a housing provided with a water inlet and a gas outlet on a top wall portion of the housing, and a water outlet and a gas inlet on a side wall portion of the housing, wherein the side wall portion is provided at an outer circumferential edge of the top wall portion and extends downward, and wherein the water outlet is located below the gas inlet;
   an elastic cap, at least a part of the elastic cap being provided in the housing, and the elastic cap is provided with an elastic deformation face;
   a driving device configured to drive the elastic cap to perform elastic deformation so that, when the elastic cap is elastically deformed, the elastic cap fluidically separates at least one of the water inlet or gas inlet from the water outlet or the gas outlet, respectively, and when the elastic cap is not elastically deformed, the water inlet or gas inlet is not fluidically separated from the water outlet or the gas outlet, respectively,
   the elastic cap is provided with a cavity therein, the driving device being connected to the cavity so as to change gas pressure or liquid pressure in the cavity, and
   a medium circulation cavity is defined between the housing and the elastic cap, and the water inlet, the water outlet, the gas inlet, and the gas outlet are all in fluidic communication with the medium circulation cavity,
   wherein, in a normal state, a top wall of the elastic deformation face is recessed downwards, the top wall and the water inlet, and the gas outlet are spaced apart by a certain distance, when a pressure in the cavity is increased up to a certain value, the elastic deformation face protrudes upwards to block the water inlet and the gas outlet at the same time, and the gas outlet is in communication with outside air.

2. The valve according to claim 1, wherein the driving device is a pneumatic driving device or a hydraulic driving device, and wherein the gas inlet is adjacent the water outlet, and the gas outlet is adjacent the water inlet.

3. The valve according to claim 1, wherein the elastic cap is a silica gel piece.

4. The valve according to claim 1, wherein elastic deformation face performs the elastic deformation so as to separate the water inlet from the water outlet and to separate the gas inlet from the gas outlet when the driving device drives the elastic cap.

5. The valve according to claim 1, wherein the elastic cap is configured to be a cylindrical structure having an open bottom;
   the valve further comprises: a base enclosing a bottom of the elastic cap and provided with an inflating port in communication with an interior of the elastic cap, the driving device being connected to the inflating port.

6. The valve according to claim 4, wherein the elastic cap further comprises a side wall, and at least a part of the top wall is formed as the elastic deformation face.

7. The valve according to claim 5, wherein the base is provided with an annular projection protruding towards the housing, and the housing is fitted over the annular projection.

8. The valve according to claim 7, wherein the elastic cap comprises a side wall, a mounting portion is provided at an end of the side wall away from the top wall, the mounting portion extends towards an outer side of the side wall, and the housing and the annular projection cooperate to clamp the mounting portion.

9. A coffee maker, comprising:
   a boiler;
   a brewing chamber in communication with the boiler; and
   a valve including:
      a housing provided with a water inlet and a gas outlet on a top wall portion of the housing, and a water outlet and a gas inlet on a side wall portion of the housing, wherein the side wall portion is provided at an outer circumferential edge of the top wall portion and extends downward, and wherein the water outlet is located below the gas inlet; an
      elastic cap, at least a part of the elastic cap being provided in the housing, and the elastic cap is provided with an elastic deformation face;
      a driving device configured to drive the elastic cap to perform elastic deformation so as to separate the water inlet from the water outlet and to separate the gas inlet from the gas outlet,
      the elastic cap is provided with a cavity therein, the driving device being connected to the cavity so as to change gas pressure or liquid pressure in the cavity, and
      a medium circulation cavity is defined between the housing and the elastic cap, and the water inlet, the water outlet, the gas inlet, and the gas outlet are all in fluidic communication with the medium circulation cavity,
      wherein, in a normal state, a top wall of the elastic deformation face is recessed downwards, the top wall and the water inlet, and the gas outlet are spaced apart by a certain distance, when a pressure in the cavity is increased up to a certain value, the elastic deformation face protrudes upwards to block the water inlet and the gas outlet at the same time, and the gas outlet is in communication with outside aft, wherein the gas inlet and the gas outlet are configured to circulate gas, the gas inlet being in communication with the boiler, the gas outlet being in communication with outside aft, the elastic cap being convertible between a closed state where the gas inlet and the gas outlet are fluidically separated and a communication state where the gas inlet and the gas outlet are fluidically communicated, the elastic cap being in the communication state normally;

wherein when the driving device is communicated with the boiler and the elastic cap is in the closed state, the driving device configured to drive water in the boiler to flow to the brewing chamber through a pipeline.

10. The coffee maker according to claim 9, wherein the coffee maker further comprises a water tank, the water inlet and the water outlet are configured to circulate liquid, the water inlet is communicated with the water tank, the water outlet is communicated with the boiler, the elastic cap fluidically separates the water inlet from the water outlet when in the closed state, and the elastic cap communicates the water inlet with the water outlet when in the communication state.

11. The coffee maker according to claim 10, wherein at least a part of the water tank is disposed above the boiler.

12. The coffee maker according to claim 9, wherein the boiler is provided with a temperature sensor configured to detect temperature inside the boiler, and further provided with a liquid level sensor configured to detect a water level in the boiler.

13. The coffee maker according to claim 9, wherein the driving device is a pneumatic driving device or a hydraulic driving device.

14. The coffee maker according to claim 9, wherein the elastic deformation face performs the elastic deformation so as to separate the water inlet from the water outlet and to separate the gas inlet from the gas outlet when the driving device drives the elastic cap.

15. The coffee maker according to claim 9, wherein the elastic cap is configured to be a cylindrical structure having an open bottom;

the valve further comprises: a base enclosing a bottom of the elastic cap and provided with an inflating port in communication with an interior of the elastic cap, the driving device being connected to the inflating port.

16. The coffee maker according to claim 14, wherein the elastic cap further comprises a side wall, and at least a part of the top wall is formed as the elastic deformation face.

17. The coffee maker according to claim 15, wherein the base is provided with an annular projection protruding towards the housing, and the housing is fitted over the annular projection.

18. The coffee maker according to claim 17, wherein the elastic cap comprises a side wall, a mounting portion is provided at an end of the side wall away from the top wall, the mounting portion extends towards an outer side of the side wall, and the housing and the annular projection cooperate to clamp the mounting portion.

19. The valve according to claim 1, wherein the water inlet has a larger diameter than the gas inlet, and the water outlet has a larger diameter than the gas outlet.

* * * * *